United States Patent
Shiota et al.

(10) Patent No.: US 11,623,969 B2
(45) Date of Patent: Apr. 11, 2023

(54) METHOD FOR PRODUCING WATER/OIL REPELLENT COMPOSITION AND METHOD FOR PRODUCING WATER/OIL REPELLENT ARTICLE

(71) Applicant: AGC Inc., Chiyoda-ku (JP)

(72) Inventors: Yukiko Shiota, Chiyoda-ku (JP); Hiroyuki Hara, Chiyoda-ku (JP); Reika Fukuda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 305 days.

(21) Appl. No.: 16/994,715

(22) Filed: Aug. 17, 2020

(65) Prior Publication Data

US 2020/0377634 A1    Dec. 3, 2020

Related U.S. Application Data

(63) Continuation of application No. PCT/JP2019/007355, filed on Feb. 26, 2019.

(30) Foreign Application Priority Data

Mar. 8, 2018   (JP) ............................. JP2018-042322

(51) Int. Cl.
| | |
|---|---|
| *C08F 220/24* | (2006.01) |
| *C08F 2/22* | (2006.01) |
| *C09K 3/18* | (2006.01) |
| *C08F 265/06* | (2006.01) |
| *C08F 220/18* | (2006.01) |

(52) U.S. Cl.
CPC ............. *C08F 220/24* (2013.01); *C08F 2/22* (2013.01); *C08F 220/18* (2013.01); *C08F 220/1818* (2020.02); *C08F 265/06* (2013.01); *C09K 3/18* (2013.01); *D06M 2200/11* (2013.01); *D06M 2200/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,057,577 A | * | 10/1991 | Matsuo | D06M 15/277 525/902 |
| 5,798,406 A | * | 8/1998 | Feret | C08F 20/22 524/460 |
| 6,113,936 A | * | 9/2000 | Takebayashi | B01J 13/18 424/419 |
| 2003/0118722 A1 | * | 6/2003 | Lee | C08F 291/00 427/212 |
| 2009/0030114 A1 | * | 1/2009 | Wang | D06M 15/277 523/201 |

FOREIGN PATENT DOCUMENTS

| | | | | |
|---|---|---|---|---|
| CN | 105859950 A | * | 8/2016 | ............ C08F 220/18 |
| CN | 107700216 A | * | 2/2018 | ............ C08F 265/06 |
| CN | 105960418 B | * | 1/2019 | ................ C08F 2/22 |
| JP | 2009-155591 A | | 7/2009 | |
| WO | WO 2008/136436 A1 | | 11/2008 | |

OTHER PUBLICATIONS

Machine translation of CN 107700216 A, retrieved Aug. 2022 (Year: 2022).*
Machine translation of CN 105960418 B, retrieved Aug. 2022 (Year: 2022).*
Machine translation of CN 105859950 A, retrieved Aug. 2022 (Year: 2022).*
International Search Report dated May 28, 2019 in PCT/JP2019/007355 filed Feb. 26, 2019, 1 page.

* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

A method for producing a water/oil repellent composition can produce an article which is excellent in the oil repellency while maintaining the water repellency and the heavy-rain durability. The method includes mixing an emulsion of a polymer having from 10 to 50 mass % of units based on a monomer having a perfluoroalkyl group per all units and an emulsion of a monomer component containing at least 80 mass % of a monomer having a perfluoroalkyl group so that the proportion of the mass of the polymer will be from 50 to 99 mass % per the sum of the mass of the polymer and the total mass of the monomer component and then polymerizing the monomer component. The monomer component includes emulsified particles in the emulsion of the monomer component. The emulsified particles have an average particle size of from 50 to 600 nm.

11 Claims, No Drawings

METHOD FOR PRODUCING WATER/OIL REPELLENT COMPOSITION AND METHOD FOR PRODUCING WATER/OIL REPELLENT ARTICLE

TECHNICAL FIELD

The present invention relates to a method for producing a water/oil repellent composition and a method for producing a water/oil repellent article.

BACKGROUND ART

Fiber products such as clothes are often required to repel rainwater, etc., and water repellency, heavy-rain durability and oil repellency are imparted. As a method for imparting water/oil repellency to a surface of an article such as fiber products, a method of treating the article with a water/oil repellent composition having a polymer having units based on a monomer having a perfluoroalkyl group dispersed in a medium, is known. When the proportion of the units based on the monomer having a perfluoroalkyl group in the polymer is high, an article excellent in oil repellency can be obtained. However, the monomer having a perfluoroalkyl group is expensive.

Patent Document 1 discloses a water/oil repellent composition containing a copolymer obtained by copolymerizing a monomer having a $C_{1-6}$ perfluoroalkyl group and an acrylate monomer having a $C_{20-30}$ alkyl group. The above copolymer is inexpensive, since the proportion of the monomer having a perfluoroalkyl group is low, however, its oil repellency is insufficient, since the proportion of the monomer having a perfluoroalkyl group is low. The oil repellency is improved by increasing the proportion of the monomer having a perfluoroalkyl group, however, if the proportion is increased, the copolymer is expensive, and the heavy-rain durability and the water repellency deteriorate. That is, in conventional techniques, it is difficult to obtain an article excellent in the oil repellency, while the water repellency and the heavy-rain durability are maintained or not worsen significantly.

PRIOR ART DOCUMENT

Patent Document

Patent Document 1: WO2008/136436

DISCLOSURE OF INVENTION

Technical Problem

It is an object of the present invention to provide a method for producing a water/oil repellent composition whereby a water/oil repellent article which is excellent in the oil repellency and of which water repellency and heavy-rain durability are maintained or not worsen significantly, and a method for producing a water/oil repellent composition.

Solution to Problem

The present invention has the following embodiments.
[1] A method for producing a water/oil repellent composition, which comprises mixing an emulsion of a polymer having units based on a monomer having a perfluoroalkyl group and an emulsion of a monomer component containing a monomer having a perfluoroalkyl group and then polymerizing the monomer component, wherein
  the proportion of the units based on a monomer having a perfluoroalkyl group is from 10 to 50 mass % per all units in the polymer,
  the proportion of the monomer having a perfluoroalkyl group is at least 80 mass % per the total amount of the monomer component, and
  the above mentioned two emulsions are mixed so that the proportion of the mass of the polymer will be from 50 to 99 mass % per the sum of the mass of the polymer and the total mass of the monomer component.
[2] The method for producing a water/oil repellent composition according to [1], wherein the polymer further has units based on a (meth)acrylate having a $C_{12-30}$ alkyl group and having no polyfluoroalkyl group, and the proportion of the above units is from 10 to 80 mass % per all units in the polymer.
[3] The method for producing a water/oil repellent composition according to [2], wherein the polymer has units based on a (meth)acrylate having a $C_{20-30}$ alkyl group and having no polyfluoroalkyl group, and the proportion of the above units is from 20 to 100 mass % per all units of units based on the (meth)acrylate having a $C_{12-30}$ alkyl group and having no polyfluoroalkyl group.
[4] The method for producing a water/oil repellent composition according to any one of [1] to [3], wherein the polymer further has units based on a halogenated olefin, and the proportion of the above units is at most 50 mass % per all units in the polymer.
[5] The method for producing a water/oil repellent composition according to any one of [1] to [4], wherein the polymer further has units based on a monomer having a cross-linkable functional group, and the proportion of the above units is at most 20 mass % per all units in the polymer.
[6] The method for producing a water/oil repellent composition according to any one of [1] to [5], wherein the monomer component further contains from 1 to 20 mass % of a (meth)acrylate having a $C_{12-30}$ alkyl group and having no polyfluoroalkyl group per the total mass of the monomer component.
[7] The method for producing a water/oil repellent composition according to any one of [1] to [6], wherein the monomer component further contains from 0.1 to 15 mass % of a monomer having a cross-linkable functional group per the total mass of the monomer component.
[8] The method for producing a water/oil repellent composition according to any one of [1] to [7], wherein the emulsion of the monomer component is an emulsion obtained by emulsifying a mixture containing the monomer component, a surfactant and a medium by a high pressure emulsifier.
[9] The method for producing a water/oil repellent composition according to any one of [1] to [8], wherein the average particle size of emulsified particles in the emulsion of the monomer component is from 50 to 600 nm.
[10] The method for producing a water/oil repellent composition according to any one of [1] to [9], wherein at least one crosslinking agent selected from the group consisting of an isocyanate type crosslinking agent, a methylol type crosslinking agent, a carbodiimide type crosslinking agent and an oxazoline type crosslinking agent is added after the polymerization of the monomer component.
[11] A method for producing a water/oil repellent article, which comprises treating an article to be treated with an water/oil repellent composition produced by the production method as defined in any one of [1] to [10].

Advantageous Effects of Invention

According to the present invention, it is possible to obtain a water/oil repellent article which is excellent in the oil repellency and of which water repellency and heavy-rain durability are maintained or not worsen significantly.

DESCRIPTION OF EMBODIMENTS

In this specification, a compound represented by the formula (1) will be referred to as compound (1). The same applies to compounds represented by other formulae.

In this specification, a group represented by the formula (2) will be referred to as group (2). The same applies to groups represented by other formulae.

Meanings of the following terms in this specification are as follows.

A "unit based on a monomer" is collective term of an atomic group directly formed by polymerizing one molecule of a monomer and an atomic group obtained by chemically converting a part of the above atomic group. In this specification, a unit based on a monomer is also simply referred to as a monomer unit.

An "$R^f$ group" means a group in which some or all hydrogen atoms in an alkyl group are substituted by fluorine atoms. A polyfluoroalkyl group is an $R^f$ group.

An "$R^F$ group" specifically means a group in which all of hydrogen atoms in alkyl group are substituted by fluorine atoms. A perfluoroalkyl group is an $R^F$ group.

A "(meth)acrylate" is a general term for an acrylate and a methacrylate.

"$\phi$" in a chemical formula means a phenylene group. The phenylene group is any one of a 1,2-phenylene group, a 1,3-phenylene group and a 1,4-phenylene group.

A "number average molecular weight" (hereinafter referred to also as "Mn") and a "mass average molecular weight" (hereinafter referred to also as "Mw") are values obtained as calculated as polymethylmethacrylate by a gel permeation chromatography (GPC) method.

A "solid content concentration" is calculated by solid content concentration=(mass of solid content/mass of sample)×100, where mass of sample is the mass of the sample before heating, and mass of solid content is the mass after drying the sample by a convection dryer at 120° C. for 4 hours.

[Method for Producing Water/Oil Repellent Composition]

The method for producing a water/oil repellent composition of the present invention is a method, which comprises mixing an emulsion of the after-mentioned polymer (hereinafter referred to also as "starting material polymer") and an emulsion of the after-mentioned monomer component (hereinafter referred to also as "monomer component (b)"), and then polymerizing the monomer component (b) (hereinafter, such a polymerization method is also referred to as "two-step polymerization").

(Emulsion of Polymer)

The starting material polymer is a copolymer having units based on a monomer having an $R^f$ group (hereinafter referred to also as "Rf monomer") and units based on a monomer other than the Rf monomer (hereinafter referred to also as "another monomer"). The starting material polymer has the Rf monomer units in the proportion of from 10 to 50 mass % per all units.

The Rf monomer is preferably a compound (1) represented by the following formula, since the water/oil repellency will be excellent.

$$(Z-Y)_n X \quad (1)$$

Z is a $C_{1-6} R^F$ group or a group (2) represented by the following formula:

$$C_i F_{2i+1}(CH_2CF_2)_p(CF_2CF_2)_q- \quad (2)$$

wherein i is an integer of from 1 to 6, p is an integer of from 1 to 4, and q is an integer of from 1 to 3.

The carbon number of the $R^F$ group is preferably from 4 to 6. The $R^F$ group may be linear or branched and is preferably linear.

Z may, for example, be $F(CF_2)_4-$, $F(CF_2)_5-$, $F(CF_2)_6-$ or $(CF_3)_2CF(CF_2)_2-$.

Y is a bivalent organic group having no fluorine atom, or a single bond.

The bivalent organic group is preferably an alkylene group. The alkylene group may be linear or branched. The bivalent organic group may include $-O-$, $-NH-$, $-CO-$, $-SO_2-$, $-S-$, $-CD^1=CD^2-$ (wherein each of $D^1$ and $D^2$ is a hydrogen atom or a methyl group), $-\phi-C(O)O-$, etc.

Y may, for example, be $-CH_2-$, $-CH_2CH_2-$, $-(CH_2)_3-$, $-CH_2CH_2CH(CH_3)-$, $-CH=CH-CH_2-$, $-S-CH_2CH_2-$, $-SO_2-CH_2CH_2-$, $-CH_2CH_2CH_2-S-CH_2CH_2-$, $-CH_2CH_2CH_2-SO_2-CH_2CH_2-$ or $-CH_2CH_2-OC(O)-\phi-$.

n is 1 or 2.

X is any one of the group (3-1) to the group (3-5) represented by the following formulae when n is 1 or any one of the group (4-1) to the group (4-4) represented by the following formulae when n is 2.

$$-CR=CH_2 \quad (3-1)$$

$$-C(O)OCR=CH_2 \quad (3-2)$$

$$-OC(O)CR=CH_2 \quad (3-3)$$

$$-OCH_2-\phi-CR=CH_2 \quad (3-4)$$

$$-OCH=CH_2 \quad (3-5)$$

wherein R is a hydrogen atom, a methyl group or a halogen atom.

$$-CH[(CH_2)_m CR=CH_2]- \quad (4-1)$$

$$-CH[(CH_2)_m C(O)OCR=CH_2]- \quad (4-2)$$

$$-CH[(CH_2)_m OC(O)CR=CH_2]- \quad (4-3)$$

$$-OC(O)CH=CHC(O)O- \quad (4-4)$$

wherein R is the same as above, and m is an integer of from 0 to 4. R is preferably a hydrogen atom, a methyl group or a chlorine atom.

The compound (1) is preferably a (meth)acrylate having a $C_{1-6} R^F$ group and an acrylate having a $C_{1-6}$ RE group, of which an α position is substituted by a halogen atom, more preferably a (meth)acrylate having a $C_{4-6} R^F$ group and an acrylate having a $C_{4-6} R^F$ group, of which an α position is substituted by a halogen atom, from the point of the polymerization property with another monomer, the flexibility of a polymer to be obtained, the adhesion of a polymer to an article to be treated, the dispersibility or the solubility in a medium, the easiness of the polymerization, etc.

The compound (1) is particularly preferably a compound wherein Z is a $C_{4-6} R^F$ group, Y is a $C_{1-4}$ alkylene group or $CH_2CH_2OC(O)-\phi-$, n is 1, X is the group (3-3), and R is a hydrogen atom, a methyl group or a chlorine atom.

As the preferred compound (1), $C_6F_{13}C_2H_4OC(O)C(CH_3)=CH_2$, $C_6F_{13}C_2H_4OC(O)CH=CH_2$, $C_6F_{13}C_2H_4OC(O)CCl=CH_2$, $C_4F_9C_2H_4OC(O)C(CH_3)=CH_2$, $C_4F_9C_2H_4OC(O)CH=CH_2$, $C_4F_9C_2H_4OC(O)CCl=CH_2$, $F(CF_2)_6CH_2CH_2OC(O)\text{-}\phi\text{-}OC(O)CH=CH_2$, $F(CF_2)_6CH_2CH_2OC(O)\text{-}\phi\text{-}OC(O)C(CH_3)=CH_2$, $F(CF_2)_4CH_2CH_2OC(O)\text{-}\phi\text{-}OC(O)CH=CH_2$ and $F(CF_2)_4CH_2CH_2OC(O)\text{-}\phi\text{-}OC(O)C(CH_3)=CH_2$ may, for example, be mentioned.

As the $R^f$ monomer, two or more types may be used in combination.

As another monomer, a (meth)acrylate having a $C_{12-30}$ alkyl group and having no $R^f$ group (hereinafter referred to also as "long chain alkyl monomer"), a halogenated olefin and a monomer having a cross-linkable group (hereinafter referred to also as "cross-linkable monomer") may, for example, be mentioned. As another monomer, two or more types may be used in combination.

The starting material polymer preferably has long chain alkyl monomer units from the viewpoint of the further excellent washing durability and heavy-rain durability.

The carbon number of the alkyl group in the long chain alkyl monomer is from 12 to 30, preferably from 18 to 30, more preferably from 20 to 30, further preferably from 20 to 24. When the carbon number of the alkyl group is at least the lower limit value of the above range, the washing durability and the heavy-rain durability will be excellent. When the carbon number of the alkyl group is at most the upper limit value of the above range, handling in the polymerization step will be easy, and a starting material polymer will be obtained with good yield.

The long chain alkyl monomer may, for example, be a stearyl (meth)acrylate, a behenyl (meth)acrylate or an icosyl (meth)acylate.

The starting material polymer preferably has units based on a long chain alkyl monomer having a $C_{20-24}$ alkyl group as the long chain alkyl monomer units.

The starting material polymer preferably has halogenated olefin units, from the viewpoint of excellent adhesion to an object to be treated and further excellent washing durability and heavy-rain durability.

The halogenated olefin is preferably a chlorinated olefin or a fluorinated olefin.

The halogenated olefin is preferably vinyl chloride, vinylidene chloride, tetrafluoroethylene or vinylidene fluoride, more preferably vinyl chloride or vinylidene chloride, from the viewpoint of excellent adhesion to an object to be treated.

The starting material polymer preferably has cross-linkable monomer units from the viewpoint of further excellent washing durability and heavy-rain durability.

The cross-linkable functional group in the cross-linkable monomer is a functional group having at least one bond selected from a covalent bond, an ionic bond and a hydrogen bond and is preferably a functional group capable of forming a crosslinked structure by interaction of such a bond.

As the cross-linkable functional group, from such a viewpoint that the washing durability and heavy-rain durability will be excellent, preferred is an isocyanate group, a blocked isocyanate group, an alkoxysilyl group, an amino group, an alkoxymethylamide group, a silanol group, an ammonium group, an amide group, an epoxy group, a hydroxy group, an oxazoline group, a carboxy group, an alkenyl group, or a sulfonic acid group. In particular, an epoxy group, a hydroxy group, a blocked isocyanate group, an alkoxysilyl group, an amino group or a carboxy group is preferred.

The cross-linkable monomer is preferably a (meth)acrylate, an acrylamide, a vinyl ether or a vinyl ester.

As the cross-linkable monomer, N-methylol (meth)acrylamide, N-butoxymethyl (meth)acrylamide, 2-hydroxyethyl (meth)acrylate, 4-hydroxybutyl (meth)acrylate, a 3,5-dimethylpyrazole adduct of 2-isocyanatoethyl (meth)acrylate, a 3,5-dimethylpyrazole adduct of 3-isocyanatopropyl (meth)acrylate, 3-chloro-2-hydroxypropyl (meth)acrylate, diacetone acrylamide, glycidyl methacrylate, glycerol (meth)acrylate, a polycaprolactone ester of hydroxyethyl (meth)acrylate, a urethane prepolymer of phenyl glycidyl acrylate and tolylene diisocyanate (AT-600, manufactured by Kyoeisha Chemical Co. Ltd.) or 2-[1,3,3-trimethyl-5-(1-methylpropylidene aminooxy carbonylamino)-1-cyclohexylmethylaminocarbonyloxy]ethyl methacrylate (TEC coat HE-6P, manufactured by Kyokenkasei K. K.) is more preferred from such a viewpoint that the washing durability and heavy-rain durability will be further excellent. N-methylol (meth)acrylamide, 2-hydroxyethyl (meth)acrylate, a 3,5-dimethylpyrazole adduct of 2-isocyanatoethyl (meth)acrylate or 3-chloro-2-hydroxypropyl (meth)acrylate is particularly preferred.

As another monomer, a long chain alkyl monomer, a halogenated olefin or a monomer other than the cross-linkable monomer (hereinafter referred to also as "monomer (m)") may be used.

As the monomer (m), the following compounds may, for example, be mentioned.

Methyl (meth)acrylate, ethyl (meth)acrylate, propyl (meth)acrylate, butyl (meth)acrylate, cyclohexyl (meth)acrylate, isobornyl (meth)acrylate, 2-ethylhexyl (meth)acrylate, n-hexyl (meth)acrylate, vinyl acetate, vinyl propionate, butene, isoprene, butadiene, ethylene, propylene, pentene, ethyl-2-propylene, butyl ethylene, cyclohexyl propyl ethylene, decyl ethylene, dodecyl ethylene, hexene, isohexyl ethylene, neopentyl ethylene, (1,2-diethoxycarbonyl) ethylene, (1,2-dipropoxycarbonyl) ethylene, a vinyl alkyl ether (such as methoxyethylene, ethoxyethylene, butoxy ethylene or pentyl oxyethylene), 2-methoxypropylene, cyclopentanoyloxy ethylene, cyclopentyl acetoxy ethylene, styrene, α-methyl styrene, p-methyl styrene, hexyl styrene, octyl styrene, nonyl styrene and chloroprene.

N,N-Dimethyl (meth)acrylamide, vinyl alkyl ketone, benzyl (meth)acrylate, octyl (meth)acrylate, decyl methacrylate, cyclododecyl acrylate, 3-ethoxypropyl acrylate, methoxybutyl acrylate, 2-ethyl butyl acrylate, 1,3-dimethylbutyl acrylate, 2-methylpentyl acrylate, aziridinyl ethyl (meth)acrylate, 2-ethylhexyl polyoxyalkylene (meth)acrylate and polyoxyalkylene di(meth)acrylate.

Crotonic acid alkyl esters, maleic acid alkyl esters such as dioctyl maleate, fumaric acid alkyl esters, citraconic acid alkyl esters, mesaconic acid alkyl esters, triallyl cyanurate, allyl acetate, N-vinyl carbazole, maleimide, N-methyl maleimide, (meth)acrylate having a silicone in its side chain, (meth)acrylate having a urethane bond, (meth)acrylate having a polyoxyalkylene chain having a $C_{1-4}$ alkyl group at its terminal, alkylene di(meth)acrylate, etc.

The starting material polymer is preferably a polymer having units based on a (meth)acrylate having a $C_{4-6}R^F$ group and at least one member of units based on a monomer selected from the group consisting of a behenyl (meth)acrylate, a stearyl (meth)acrylate, a vinyl chloride, a vinylidene chloride, 2-hydroethyl methacrylate and N-methylol acrylamide.

The proportion of the Rf monomer units in the starting material polymer is from 10 to 50 mass %, preferably from 10 to 40 mass %, more preferably from 10 to 30 mass %, further preferably from 10 to 20 mass %, per all units.

The proportion of the long chain alkyl monomer units in the starting material polymer is preferably from 10 to 80 mass %, more preferably from 20 to 70 mass %, further preferably from 30 to 70 mass %, particularly preferably from 40 to 60 mass %, per all units. When the proportion of the Rf monomer units is at least the lower limit value of the above range and at most the upper limit value, and the proportion of the long chain alkyl monomer units is at least the lower limit value of the above range, the water repellency and the heavy-rain durability will be excellent. When the proportion of the Rf monomer units is at least the lower limit value of the above range, and the proportion of the long chain alkyl monomer units is at most the upper limit value of the above range, the oil repellency will be obtained.

The proportion of the units based on a long chain alkyl monomer having a $C_{20-30}$ alkyl group is preferably at least 10 mass %, more preferably at least 15 mass %, further preferably at least 20 mass %, per all units of the long chain alkyl monomer in the starting material polymer. The proportion of the units based on the long chain alkyl monomer having a $C_{20-30}$ alkyl group may be 100 mass % and is preferably at most 100 mass %, preferably at most 98 mass %, more preferably at most 95 mass %, per all units of the long chain alkyl monomer units in the starting material polymer. When the proportion of the units based on the long chain alkyl monomer having a $C_{20-30}$ alkyl group is at least the lower limit value, the heavy-rain durability will be excellent, and when at most the above upper limit value, the oil repellency and the heavy-rain durability will be further excellent.

In a case where the starting material polymer has the halogenated olefin units, the proportion of the halogenated olefin units in the starting material polymer is preferably at most 50 mass %, more preferably from 1 to 45 mass %, further preferably from 5 to 35 mass %, particularly preferably from 10 to 25 mass %, per all units. When the proportion of the halogenated olefin units is at least lower limit value of the above range, the adhesion to an article to be treated will be excellent. When the Rf monomer units and the long chain alkyl monomer units fall within the above ranges, and the proportion of the halogenated olefin units is at most the above upper limit value, the water repellency and the heavy-rain durability will be further excellent.

In a case where the starting material polymer has the cross-linkable monomer units, the proportion of the cross-linkable monomer units in the starting material polymer is preferably at most 20 mass %, more preferably from 0.1 to 15 mass %, further preferably from 0.1 to 10 mass %, particularly preferably from 0.1 to 7 mass %, per all units. When the proportion of the cross-linkable monomer units is at least the lower limit value of the above range, the water repellency after wash and the heavy-rain durability over a long time will be excellent. When the proportion of the cross-linkable monomer units is at most the upper limit value of the above range, the water/oil repellent composition will be excellent in the storage stability.

The proportion of the units based on the monomer (m) in the starting material polymer is preferably from 0 to 35 mass %, more preferably from 0 to 30 mass %, further preferably from 0 to 20 mass %, particularly preferably from 0 to 15 mass %, per all units. When the proportion of the units based on the monomer (m) is at least the lower limit value of the above range and at most the upper limit of the above range, the water repellency and the heavy-rain durability will be excellent.

The proportion of the monomer units in the polymer is calculated based on the amount of the monomer charged when producing the polymer.

Mw of the starting material polymer is preferably from 8,000 to 1,000,000, more preferably from 10,000 to 800,000. When Mw of the starting material polymer falls within the above range, the water repellency and the oil repellency tend to be obtained.

Mn of the starting material polymer is preferably from 3,000 to 800,000, more preferably from 5,000 to 600,000. When Mn of the starting material polymer falls within the above range, the water repellency and the oil repellency tend to be obtained.

As the starting material polymer contained in an emulsion of the starting material polymer, two or more types may be contained.

The emulsion of the starting material polymer may, for example, be produced by a method of polymerizing a monomer component (hereinafter referred to also as "monomer component (a)") containing an Rf monomer and another monomer for forming the starting material polymer in the presence of a surfactant and a polymerization initiator in a medium. It is preferred to preliminarily emulsify a mixture containing a monomer component (a), a surfactant and a medium before the polymerization for improving the yield of the starting material polymer. The method of the emulsion treatment is not particularly restricted, and a method of using a high pressure homogenizer, an ultrasonic homogenizer or a high speed homogenizer may, for example, be mentioned. The method of using a high pressure emulsifier is preferred, since the dispersion stability before and after the polymerization and at the time of storage will be excellent.

The preferred proportion of each monomer in the monomer component (a) is the same as the preferred proportion of the units based on each monomer in the above-mentioned starting material polymer.

As the medium, water, alcohols, glycols, glycol ethers, glycol esters, halogenated compounds, hydrocarbons, ketones, esters, ethers, nitrogen compounds, etc. may be mentioned. As the medium, two or more types may be used in combination. From the viewpoint of the solubility and handling efficiency, at least one medium selected from the group consisting of water, alcohols, glycols, glycol ethers and glycol esters is preferred. When two or more types of media are to be used in combination, it is preferred to use water and other media in combination.

As the surfactant, an anionic surfactant, a nonionic surfactant, a cationic surfactant and an amphoteric surfactant may, for example, be mentioned, and the nonionic surfactant, the cationic surfactant and the amphoteric surfactant are preferred. As the surfactant, two or more types may be used in combination.

As the nonionic surfactant, surfactants s1 to s6 disclosed in WO2010/047258 and WO2010/123042, and amidoamine surfactants disclosed in Japanese Patent No. 5569614 may, for example, be mentioned.

As the cationic surfactant, surfactant s7 disclosed in WO2010/047258 and WO2010/123042 may, for example, be mentioned.

As the amphoteric surfactant, surfactant s8 disclosed in WO2010/047258 and WO2010/123042 may, for example, be mentioned.

As the polymerization initiator, a thermal polymerization initiator, a photopolymerization initiator, a radiation polymerization initiator, a radical polymerization initiator, an ionic polymerization initiator, etc. may be mentioned. As the polymerization initiator, two or more types may be used in combination.

The polymerization initiator is preferably a water-soluble or oil-soluble radical polymerization initiator. As the radical polymerization initiator, a commonly employed initiator such as an azo polymerization initiator, a peroxide polymerization initiator or a redox initiator is used depending on the polymerization temperature. As the radical polymerization initiator, an azo compound is preferred, and a salt of the azo compound is more preferred.

The polymerization temperature is preferably from 20 to 150° C.

At the time of the polymerization of the monomer component (a), a molecular weight modifier may be used. As the molecular weight modifier, mercapto ethanol, mercapto glycerol, n-octyl mercaptan, n-dodecyl mercaptan, t-dodecyl mercaptan, stearyl mercaptan, etc. may be mentioned. As the molecular weight modifier, two or more types may be used in combination.

The monomer component (a) concentration in the emulsion of the monomer component (a) is preferably from 20 to 50 mass %, more preferably from 25 to 40 mass %. When the monomer component (a) concentration in the emulsion is at least the lower limit value of the above range, the reactivity of the polymerization will be good. When the monomer component (a) concentration in the emulsion is at most the upper limit value of the above range, a latex tends not to agglomerate, and the polymerization will stably proceed.

The content of the surfactant in the emulsion of the starting material polymer is preferably from 1 to 10 parts by mass, more preferably from 2 to 8 parts by mass, per 100 parts by mass of the monomer component (a) in total.

The solid content concentration in the emulsion of the starting material polymer is preferably from 10 to 50 mass %, more preferably from 15 to 40 mass %. When the solid content concentration of the emulsion of the starting material polymer is at least the lower limit value of the above range, the handling efficiency will be good at the time of the polymerization reaction when mixing the monomer component (b). When the solid content concentration of the emulsion of the starting material polymer is at most the upper limit value of the above range, a latex tends not to agglomerate, and a stable emulsion of the starting material polymer will be obtained.

(Emulsion of the Monomer Component (b))

The monomer component (b) contains from 80 to 100 mass % of the Rf monomer. The Rf monomer to be contained in the monomer component (b) may, for example, be the same Rf monomer mentioned for the starting material polymer. As the Rf monomer to be used for the monomer component (b), two or more types may be used.

The monomer component (b) may contain a monomer other than the Rf monomer. The monomer other than the Rf monomer may, for example, be a long chain alkyl monomer, a halogenated olefin, a cross-linkable monomer or a monomer (m). The long chain alkyl monomer, the halogenated olefin and the cross-linkable monomer are preferred, and the long chain alkyl monomer and the cross-linkable monomer are more preferred. Other monomers to be used for the monomer component (b), two or more types may be used.

In a case where the monomer component (b) contains the Rf monomer and the monomer other than the Rf monomer, the proportion of the Rf monomer in the monomer component (b) is at least 80 mass %, preferably from 80 to 99 mass %, more preferably from 90 to 99 mass %, per the total amount of the monomer component (b). When the proportion of the Rf monomer in the monomer component (b) is at least the lower limit value of the above range, the oil repellency will be excellent. When the proportion of the Rf monomer in the monomer component (b) is at most the upper limit value of the above range, the effect obtained by another monomer will be obtained.

In a case where the monomer component (b) contains a long chain alkyl monomer, the proportion of the long chain alkyl monomer in the monomer component (b) is preferably from 1 to 20 mass %, more preferably from 1 to 10 mass %, per the total amount of the monomer component (b). When the proportion of the long chain alkyl monomer in the monomer component (b) is at least the lower limit value of the above range, the compatibility with the starting material polymer will be high, and the durability will be excellent. When the proportion of the long chain alkyl monomer in the monomer component (b) is at most the upper limit value of the above range, the high oil repellency by the Rf monomer will be maintained.

In a case where the monomer component (b) contains a cross-linkable monomer, the proportion of the cross-linkable monomer in the monomer component (b) is preferably from 0.1 to 15 mass % more preferably from 0.1 to 10 mass % per the total amount of the monomer component (b). When the proportion of the cross-linkable monomer in the monomer component (b) is at least the lower limit value of the above range, the durability will be excellent. When the proportion of the cross-linkable monomer in the monomer component (b) is at most the upper limit value of the above range, a high oil repellency by the Rf monomer will be maintained.

The emulsion of the monomer component (b) may, for example, be produced by a method of mixing the monomer component (b), a medium and a surfactant, followed by emulsion treatment. The medium and the surfactant used for the emulsion of the monomer component (b) may, for example, be the same ones mentioned in the production of the emulsion of the starting material polymer, and preferred embodiments are also the same. The method of the emulsion treatment is not particularly restricted, and a method of using a high pressure emulsifier, a ultrasonic homogenizer or a high speed homogenizer may, for example, be mentioned. The method of using a high pressure emulsifier is preferred, since the dispersion stability before and after the polymerization and at the time of storage will be excellent.

In the emulsion of the monomer component (b), the monomer component (b) is dispersed as emulsified particles in the medium. The monomer component (b) is usually liquid at normal temperature, and thereby the emulsified particles of the monomer component (b) in the emulsion are usually liquid particles. The average particles size of the emulsified particles in the emulsion of the monomer component (b) is preferably from 50 to 600 nm, more preferably from 80 to 400 nm. When the average particle size of the emulsified particles falls within the above range, the dispersion stability before and after the polymerization and at the time of storage will be good, and the emulsion of the monomer component (b) will be well mixed with the emulsion of the starting material polymer.

The content of the surfactant in the emulsion of the monomer component (b) is preferably from 1 to 10 parts by mass, more preferably from 2 to 8 parts by mass, per 100 parts by mass of the monomer component (b) in total.

The monomer component (b) concentration in the emulsion of the monomer component (b) is preferably from 20 to 50 mass %, more preferably from 25 to 40 mass %. When the monomer component (b) concentration in the emulsion is at least the lower limit value of the above range, the polymerization reactivity will be good. When the monomer component (b) concentration in the emulsion is at most the upper limit value of the above range, a latex tends not to agglomerate, and the polymerization will stably proceed.

The polymerization of the monomer component (b) in a mixed liquid in which the emulsion of the starting material polymer and the emulsion of the monomer component (b) are mixed, can be carried out in the presence of a polymerization initiator. The monomer component (b) is polymerized in the mixed liquid, whereby a water/oil repellent composition comprising the emulsion containing the polymer obtained by polymerizing the monomer component (b) in the presence of the starting material polymer can be obtained.

The polymerization initiator used for the polymerization of the monomer component (b) may, for example, be the same one mentioned in the production of the emulsion of the starting material polymer, and a preferred embodiment is also the same.

When polymerizing the monomer component (b), a molecular weight modifier may be used. The molecular weight modifier may, for example, be the same one mentioned in the production of the emulsion of the starting material polymer, and a preferred embodiment is also the same.

In the present invention, the emulsion of the starting material polymer and the emulsion of the monomer component (b) are preferably mixed so that the proportion of the mass of the starting material polymer will be from 50 to 99 mass %, per the sum of the mass of the starting material polymer and the total mass of the monomer component (b). The proportion of the mass of the starting material polymer is preferably from 60 to 99 mass %, more preferably from 70 to 99 mass %. When the proportion of the mass of the starting material polymer is at least the lower limit value of the above range, the water repellency and the heavy-rain durability of the starting material polymer are maintained or not less likely to be worsen significantly, and when at most the upper limit value of the above range, the oil repellency is further excellent.

In the method for producing a water/oil repellent composition of the present invention, after polymerizing the monomer component (b), a crosslinking agent is preferably added to the obtained emulsion, whereby the adhesion of a water/oil repellent composition to an article to be treated will be improved. The crosslinking agent is preferably at least one member selected from the group consisting of an isocyanate type crosslinking agent, a methylol type crosslinking agent, a carbodiimide type crosslinking agent and an oxazoline type crosslinking agent.

The isocyanate crosslinking agent may, for example, be an aromatic block type isocyanate crosslinking agent, an aliphatic block type isocyanate crosslinking agent, an aromatic non-block type isocyanate crosslinking agent or an aliphatic non-block type isocyanate type crosslinking agent. The isocyanate type crosslinking agent is preferably a water dispersion type emulsified with a surfactant or a self-dispersion type having a hydrophilic group.

The methylol type crosslinking agent is a compound having a nitrogen atom bonded to a methylol group, which is produced by a reaction of formaldehyde with melamine, urea, an amide, an amine or the like or a derivative having an alkyl etherified methylol group thereof. The methylol type crosslinking agent may, for example, be a reaction product of melamine and formaldehyde or methylol melamine which is a precondensate, an alkyletherified methylol melamine, a reaction product of urea and formaldehyde or methylol urea which is a precondensate, methylol-dihydroxyethylene-urea or its derivative, methylol-ethylene-urea, methylol-propylene-urea, methylol-triazone, a condensate of dicyandiamide-formaldehyde, methylol-carbamate or a methylol-(meth)acrylamide.

The carbodiimide type crosslinking agent is a polymer having a carbodiimide group in its molecule and is excellent in the reactivity with a carboxy group, an amino group or an active hydrogen-containing group in an article to be treated or a water/oil repellent composition. The active hydrogen is a hydrogen atom in a reactive group which reacts with the carbodiimide type crosslinking agent and is a hydrogen atom bonded to an oxygen atom, a nitrogen atom, a sulfur atom or the like. The active hydrogen-containing group is a group having the above active hydrogen and may, for example, be a hydroxy group, a carboxy group, an amide group, a hydrazide group, an amino group or a mercapto group.

The oxazoline type crosslinking agent is a polymer having a oxazoline group in its molecule and is excellent in the reactivity with a carboxy group in an article to be treated or a water/oil repellent composition.

In a case where the methylol type crosslinking agent is added to a water/oil repellent composition, a catalyst is preferably added with the methylol type crosslinking agent.

The catalyst may, for example, be an inorganic amine salt or an organic amine salt. The inorganic amine salt may be ammonium chloride, etc. The organic amine salt may be amino alcohol hydrochloride, semicarbazide hydrochloride, etc. The amino alcohol hydrochloride may be monoethanolamine hydrochloride, diethanolamine hydrochloride, triethanolamine hydrochloride, 2-amino-2-methylpropanol hydrochloride, etc.

In the method for producing a water/oil repellent composition of the present invention, an additive other than the crosslinking agent may be added in the water/oil repellent composition.

As the additive other than the crosslinking agent, a fluorinated polymer other than the polymer obtained by polymerizing the monomer component (b) in the presence of the starting material polymer, a non-fluorinated polymer, a water-soluble polymer (a hydrophilic polyester and its derivatives, a hydrophilic polyethylene glycol and its derivatives, etc.), a penetrant (a non-ionic surfactant with a bilaterally symmetric structure having an acetylene group at the center, etc.), an antifoaming agent, a film-forming assistant, an antifungal agent, an antimicrobial agent, an insecticide, a fire retardant, an antistatic agent, an anti-wrinkle agent, a texture modifier or a pH adjusting agent may, for example, be mentioned.

The solid content concentration of the water/oil repellent composition is preferably from 10 to 50 mass %, more preferably from 15 to 40 mass %. When the solid content concentration of the water/oil repellent composition is at least the lower limit value of the above range, the handling efficiency at a time of treatment bath adjustment is excellent. When the solid content concentration of the water/oil repellent composition is at least the lower limit value of the above range, the storage stability of the water/oil repellent composition is excellent.

As described above, the water/oil repellent composition of the present invention is produced by mixing the emulsion of the starting material polymer and the emulsion of the monomer component (b) at the specific proportion and polymerizing the monomer component (b). By treating with a water/oil repellent composition wherein as a case requires, an additive is added to the emulsion obtained by the polymerization, the water repellency and heavy-rain durability of the starting material polymer are maintained or not worsen significantly, and a water/oil repellent article which is excellent in the oil repellency can be obtained.

The reason why the above effects are obtained is not necessarily clear, however, the following is considered.

The emulsion containing the starting material polymer has relatively good water repellency and heavy-rain durability. On the other hand, the monomer component (b) contains a monomer having a large amount of fluorine, and thereby a water/oil repellent composition containing an emulsion obtained by the polymerization has good oil repellency. As shown in the after mentioned Examples, in the case of the water/oil repellent agent containing the emulsion obtained by mixing the emulsion of the starting material polymer and the emulsion of the monomer component (b) and polymerizing the monomer component (b) (two-step polymerization), the oil repellency improves, while the water repellency is not worsen significantly, as compared with water/oil repellent agents obtained by simply blending the starting material polymer and a polymer obtained by polymerizing the monomer component (b) or obtained by core-shell polymerization. That is, although specific features are not necessarily clear, it is suggested that the emulsion obtained by the production method of the present invention is in a dispersed state different from emulsions obtained by simply blending two polymers or obtained by core-shell polymerization.

[Method for Producing Water/Oil Repellent Article]

In the method for producing a water/oil repellent article of the present invention, an article to be treated is treated with the water/oil repellent composition produced by the method for producing a water/oil repellent composition of the present invention. A water/oil repellent article to which the water repellency, the heavy-rain durability and the oil repellency are imparted is thereby obtained.

As the article to be treated, fibers, woven fabrics, knitted fabrics, nonwoven fabrics, glass, paper, wood, leather, synthetic leather, stone, concrete, ceramics, metals, metal oxides, ceramic products, plastics, films, filters, porous resins and porous fibers may, for example, be mentioned. As the material of the porous resin, a polypropylene and PTFE may, for example, be mentioned.

The treating method is not particularly restricted, so long as the water/oil repellent composition can be applied to an article to be treated, and a known coating treating method such as application, impregnation, immersion, spray, brushing, padding, size press or roller may, for example, be mentioned.

After applying the water/oil repellent composition on a surface of an article to be treated, drying is preferably carried out. Drying may be carried out at room temperature or may be carried out by heating, and heating is preferred. In the case of heating, the heating temperature is preferably from 40 to 200° C. Further, in a case where the water/oil repellent composition contains a crosslinking agent, as a case requires, it is preferred to heat the water/oil repellent composition at a temperature higher than a crosslinking temperature of the crosslinking agent to cure it.

EXAMPLES

Now, the present invention will be described with reference to Examples, but the present invention is not limited thereto. Ex. 1 to 7 and Ex. 14 are Working Examples, and Ex. 8 to 13 are Comparative Examples.

[Evaluation Methods]

The methods for evaluating a test cloth treated with a water/oil repellent composition obtained in each Example will be described below.

(Oil Repellency)

With respect to a test cloth, the oil repellency was evaluated in accordance with the test method of AATCC-TM118-1966. One having +0.5(−0.5) attached to a grade indicates that the property is slightly better (worse).

TABLE 1

| Grade of oil repellency | Test solution | Surface tension (25° C.) [mN/m] |
|---|---|---|
| 8 | n-heptane | 19.8 |
| 7 | n-octane | 21.4 |
| 6 | n-decane | 23.5 |
| 5 | n-dodecane | 24.7 |
| 4 | n-tetradecane | 26.4 |
| 3 | n-hexadecane | 27.3 |
| 2 | Nujol/hexadecane (mass ration = 65/35) | 29.6 |
| 1 | Nujol | 31.2 |
| 0 | One less than 1 | — |

(Water Repellency)

With respect to a test cloth, the water repellency was evaluated in accordance with the spray test of JIS L1092 (1998). The water repellency is represented by 5 stage grades of 1 to 5. The larger the grade number is, the better the water repellency is.

(Heavy-Rain Durability)

With respect to a test cloth, in accordance with the method (Bundesmann Test) disclosed in JIS L1092 (1998) (c) method, rainfall was conducted under such conditions that the amount of rainfall was 100 mL/min, the water temperature of rainfall was 20° C., and the rainfall time was 10 min., whereupon the heavy-rain durability was evaluated. The water repellency is represented by 5 stage grades of 1 to 5.

(Measurement of Average Particle Size of Emulsified Particles in Emulsion of Monomer Component (b))

An emulsion of the monomer component (b) was diluted 50 times with distilled water filtered through a 0.2 µm cellulose acetate filter manufactured by Advantec Toyo Kaisha, Ltd., the scattering intensity of the obtained diluted liquid was measured by means of a dynamic light scattering spectrophotometer (ELS-Z2, manufactured by OTSUKA ELECTRONICS Co., LTD) under conditions of the temperature of 25° C., cumulative number of 70 times, the refractive index of the solvent of 1.3313 and the viscosity of the solvent of 0.8852 cp. The average particle size of the emulsified particles in the emulsion of the monomer component (b) was calculated from the obtained autocorrelation function by a cumulant analysis method.

Abbreviations

Abbreviations in Examples are as follows.
(Rf Monomer)
C6FMA: $F(CF_2)_6CH_2CH_2OC(O)C(CH_3)=CH_2$
(Long Chain Alkyl Monomer)
BeA: behenyl acrylate
StA: stearyl acrylate
(Halogenated Olefin)
VCM: vinyl chloride
(Cross-Linkable Monomer)
HEMA: 2-hydoxyethyl methacrylate
NMAM aqueous liquid: 52 mass % aqueous liquid of N-methylol acrylamide (NMAM)
(Surfactant)
PEO-30 aqueous solution: 10 mass % aqueous solution of polyoxyethylene oleyl ether (ethylene oxide adduct molar amount: about 30 mol, EMULGEN E430, trade name of Kao Corporation), AGE-10: acetylene glycol ethylene oxide adduct (ethylene oxide addition molar amount: 10 mol, Surfynol 465, trade name of Nisshin Chemical Industry Co., Ltd.), EPO-40: ethylene oxide propylene oxide polymer (proportion of ethylene oxide: 40 mass %, PLONON 204, trade name of NOF CORPORATION), STMAC: 63 mass % water and isopropyl alcohol solution of alkyl ($C_{16-18}$) trimethyl ammonium chloride (LIPOQUAD 18-63, trade name of Lion Specialty Chemicals Co., LTD.), CTMAC: 50 mass % water and isopropyl alcohol solution of alkyl ($C_{12-16}$) trimethyl ammonium chloride (LIPOQUAD C-50, trade name of Lion Specialty Chemicals Co., LTD.)

(Medium)
　DPG: dipropylene glycol,
　DPGMME: dipropylene glycol monomethyl ether
　Water: deionized water
(Molecular Weight Modifier)
　StSH: stearyl mercaptan,
　DoSH: n-dodecyl mercaptan
(Polymerization Initiator)
　VA-061A: 10 mass % aqueous solution of an acetate of 2,2'-azobis[2-(2-imidazolin-2-yl)propane] (VA-061, trade name of Wako Pure Chemical Industries, Ltd.)
　V-65: 2,2'-azobis(2,4-dimethyl valeronitrile) (V-65, trade name of Wako Pure Chemical Industries, Ltd.)

Production Example 1

In a glass beaker, 4.60 g of C6FMA, 18.67 g of BeA, 2.21 g of an NMAM aqueous solution, 0.16 g of HEMA, 7.78 g of a PEO-30 aqueous solution, 0.16 g of EPO-40, 0.49 g of STMAC, 18.67 g of DPGMME, 44.80 g of water and 0.31 g of DoSH were added, heated at 60° C. for 30 minutes and then mixed by means of a homomixer (BIO Mixer, manufactured by Nippon Seiki Co., Ltd.). The obtained liquid was treated at 40 MPa by means of a high pressure emulsifier (Minilab manufactured by APV Rannie), while being maintained at 60° C. to obtain an emulsion of a monomer component (a-1). The obtained emulsion of the monomer component (a-1) was put into a stainless steel reactor and cooled to at most 20° C. 1.56 g of VA-061A was added, the gas phase was replaced by nitrogen, followed by adding 6.53 g of VCM. The polymerization reaction was carried out with stirring at 60° C. for 15 hours, followed by adding water to obtain an emulsion of a starting material polymer (A-1) having a solid content concentration of 20 mass %. The concentration of the starting material polymer (A-1) in the emulsion of the starting material polymer (A-1) was 19 mass %.

The proportions of the respective units in the starting material polymer (A-1) were C6FMA units/BeA units/NMAM units/HEMA units/VCM units=14.8/60/3.7/0.5/21 (mass %).

Production Example 2

In a glass beaker, 5.60 g of C6FMA, 3.11 g of BeA, 15.71 g of StA, 0.3 g of an NMAM aqueous solution, 6.22 g of a PEO-30 aqueous solution, 0.31 g of AGE-10, 0.31 g of EPO-40, 0.49 g of STMAC, 0.31 g of CTMAC, 9.33 g of DPG, 40.74 g of water and 0.31 g of StSH were added, heated at 60° C. for 30 minutes and then mixed by means of a homomixer (BIO Mixer, manufactured by Nippon Seiki Co., Ltd.). The obtained liquid was treated in the same manner as in Production Example 1 to obtain an emulsion of a monomer component (a-2). The obtained emulsion of the monomer component (a-2) was used to obtain an emulsion of a starting material polymer (A-2) having a solid content concentration of 20 mass % in the same manner as in Production Example 1. The concentration of the starting material polymer (A-2) in the emulsion of the starting material polymer (A-2) was 19 mass %.

The proportions of the respective units in the starting material polymer (A-2) were C6FMA units/BeA units/StA units/NMAM units NCM units=18/10/50.5/0.5/21 (mass %).

Production Example 3

In a glass beaker, 21.74 g of BeA, 2.07 g of an NMAM aqueous solution, 0.15 g of HEMA, 7.27 g of a PEO-30 aqueous solution, 0.15 g of EPO-40, 0.46 g of STMAC, 17.44 g of DPGMME, 43.53 g of water and 0.29 g of DoSH were added, heated at 60° C. for 30 minutes and then mixed by means of a homomixer (BIO Mixer, manufactured by Nippon Seiki Co., Ltd.). The obtained liquid was treated in the same manner as in Production Example 1 to obtain an emulsion of a monomer component (a-3). The obtained emulsion of the monomer component (a-3) was used to obtain an emulsion of a starting material polymer (A-3) having a solid content concentration of 20 mass % in the same manner as in Production Example 1, except that the amount of VA-061A was 0.81 g, and the amount of VCM was 6.10 g. The concentration of the starting material polymer (A-3) in the emulsion of the starting material polymer (A-3) was 19 mass %.

The proportions of the respective units in the starting material polymer (A-3) were BeA units/NMAM units/HEMA units/VCM units=74.8/3.7/0.5/21 (mass %).

Ex. 1

In a glass beaker, 45.71 g of C6FMA, 2.41 g of HEMA, 12.03 g of a PEO-30 aqueous solution, 0.76 g of STMAC, 0.24 g of PEO-40, 4.81 g of DPGMME, 98.74 g of water and 0.48 g of DoSH were added, heated at 60° C. for 30 minutes and then mixed by means of a homomixer (BIO Mixture, manufactured by Nippon Seiki Co., Ltd.). The obtained liquid was treated at 40 MPa by means of a high pressure emulsifier (Minilab manufactured by APV Rannie), while being maintained at 60° C. to obtain an emulsion of a monomer compound (b-1). The average particle size of emulsified particles in the emulsion of the monomer component (b-1) was 195 nm, and the monomer component concentration in the emulsion was 29 mass %.

58.99 g of the emulsion of the starting material polymer (A-1) and 0.98 g of the emulsion of the monomer component (b-1) were put into a stainless steel reactor and cooled to at most 20° C., followed by adding 0.03 g of VA-061A, and the gas phase was replaced by nitrogen. The polymerization reaction was carried out with stirring at 60° C. for 12 hours. That is, a two-step polymerization was carried out to obtain a water/oil repellent composition (C-1) which is an emulsion containing a polymer obtained by polymerizing the monomer component (b-1) in the presence of the starting material polymer (A-1). The solid content concentration of the mixture of the emulsion of the monomer component (b-1) and VA-061A was 30 mass %. The ratio of the mass of the starting material polymer (A-1) and the total mass of the monomer component (b-1) was 98/2. The proportions of the respective monomers in the monomer component (b-1) were C6FMA/HEMA=95/5 (mass %).

The water/oil repellent composition (C-1) was diluted with tap water so as to have the solid content concentration of 1.0 mass %, and an isocyanate type crosslinking agent (MEIKANATE CX, manufactured by Meisei Chemical Works, Ltd.) was added so that the concentration would be 1.0 mass % to obtain a treatment liquid.

A dyed nylon taslan was immersed in the treatment liquid by a padding method and then squeezed so that the wet pick up would be 60 mass %. This was dried at 110° C. for 90 seconds and further dried at 180° C. for 60 seconds to obtain a test cloth. The oil repellency, the water repellency and the heavy-rain durability of the test cloth were evaluated.

Ex. 2 to 5

Water/oil repellent compositions (C-2) to (C-5) were obtained in the same manner as in Ex. 1, except that the charged amounts of the starting material polymer (A-1), the emulsion of the monomer component (b-1) and VA-061A were changed as shown in Table 3.

Test cloths were obtained in the same manner as in Ex. 1, except that the water/oil repellent compositions (C-2) to (C-5) were used, instead of the water/oil repellent composition (C-1).

Ex. 6

In a glass beaker, 33.97 g of C6FMA, 8.49 g of a PEO-30 aqueous solution, 0.54 g of STMAC, 0.17 g of PEO-40, 3.40 g of DPGMME, 69.70 g of water and 0.34 g of DoSH were added, heated at 60° C. for 30 minutes and then mixed by means of a homomixer (BIO Mixer, manufactured by Nippon Seiki Co., Ltd.). The obtained liquid was treated in the same manner as in Ex. 1 to obtain an emulsion of a monomer component (b-2). The average particle size of emulsified particles in the emulsion of the monomer component (b-2) was 210 nm, and the monomer component concentration in the emulsion was 29 mass %.

55.86 g of the emulsion of the starting material polymer (A-1) and 4.02 g of the emulsion of the monomer component (b-2) were added in a stainless steel reactor and cooled to at most 20° C., followed by adding 0.12 g of VA-061A and replacing the gas phase by nitrogen. The polymerization reaction was carried out with stirring at 60° C. for 12 hours to obtain a water/oil repellent composition (C-6). The solid content concentration of the mixture of the emulsion of the monomer component (b-2) and VA-061A was 30 mass %. The ratio of the mass of the starting material polymer (A-1) and the total mass of the monomer component (b-2) was 90/10. The proportion of the monomers in the monomer component (b-2) was C6FMA=100 (mass %).

A test cloth was obtained in the same manner as in Ex. 1, except that the water/oil repellent composition (C-6) was used, instead of the water/oil repellent composition (C-1).

Ex. 7

In a glass beaker, 27.17 g of C6FMA, 5.09 g of BeA, 1.70 g of HEMA, 8.49 g of a PEO-30 aqueous solution, 0.54 g of STMAC, 0.17 g of PEO-40, 3.40 g of DPGMME, 69.70 g of water and 0.34 g of DoSH were added, heated at 60° C. for 30 minutes and then mixed by means of a homomixer (BIO Mixer, manufactured by Nippon Seiki Co., Ltd.). The obtained liquid was treated in the same manner as in Ex. 1 to obtain an emulsion of a monomer component (b-3). The monomer component concentration in the emulsion of the monomer component (b-3) was 29 mass %.

Two-step polymerization was carried out in the same manner as in Ex. 6 to obtain a water-oil repellent composition (C-7), except that the emulsion of the monomer component (b-3) was used, instead of the emulsion of the monomer component (b-2). The ratio of the mass of the starting material polymer (A-1) and the total mass of the monomer component (b-3) was 90/10. The proportions of the respective monomers in the monomer component (b-3) were C6FMA/BeA/HEMA=80/15/5 (mass %).

A test cloth was obtained in the same manner as in Ex. 1, except that the water/oil repellent composition (C-7) was used, instead of the water/oil repellent composition (C-1).

Ex. 8

A water-oil repellent composition (C-8) was obtained in the same manner as in Ex. 1, except that the charged amounts of the starting material polymer (A-1), the emulsion of the monomer component (b-1) and VA-061A were changed as shown in Table 3.

A test cloth was obtained in the same manner as in Ex. 1, except that the water/oil repellent composition (C-8) was used, instead of the water/oil repellent composition (C-1).

Ex. 9

In a glass beaker, 23.81 g of C6FMA, 8.49 g of BeA, 1.70 g of HEMA, 8.49 g of a PEO-30 aqueous solution, 0.54 g of STMAC, 0.17 g of PEO-40, 3.40 g of DPGMME, 69.70 g of water and 0.34 g of DoSH were added, heated at 60° C. for 30 minutes and then mixed by means of a homomixer (BIO Mixer, manufactured by Nippon Seiki Co., Ltd.). The obtained liquid was treated in the same manner as in Ex. 1 to obtain an emulsion of a monomer component (b-4). The monomer component concentration in the emulsion of the monomer component (b-4) was 29 mass %.

Two-step polymerization was carried out in the same manner as in Ex. 6 to obtain a water-oil repellent composition (C-9), except that the emulsion of the monomer component (b-4) was used, instead of the emulsion of the monomer component (b-2). The ratio of the mass of the starting material polymer (A-1) and the total mass of the monomer component (b-4) was 90/10. The proportions of the respective monomers in the monomer component (b-4) were C6FMA/BeA/HEMA=70/25/5 (mass %).

A test cloth was obtained in the same manner as in Ex. 1, except that the water/oil repellent composition (C-9) was used, instead of the water/oil repellent composition (C-1).

Ex. 10

In a glass beaker, 45.71 g of C6FMA, 2.41 g of HEMA, 12.03 g of a PEO-30 aqueous solution, 0.24 g of EPO-40, 0.76 g of STMAC, 4.81 g of DPGMME, 98.74 g of water and 0.48 g of DoSH were added, heated at 60° C. for 30 minutes and then mixed by means of a homomixer (BIO Mixer, manufactured by Nippon Seiki Co., Ltd.). The obtained liquid was treated in the same manner as in Ex. 1 to obtain an emulsion of a monomer component (b-5). The monomer component concentration in the emulsion of the monomer component (b-5) was 29 mass %.

The obtained emulsion of the monomer component (b-5) was put into a stainless steel reactor and cooled to at most 20° C. Then, 4.81 g of VA-061A was added, and the gas phase was replaced by nitrogen. The polymerization reaction was carried out with stirring at 60° C. for 15 hours to obtain an emulsion of a second polymer (B-5). The proportions of the respective units in the second polymer (B-5) were C6FMA units/HEMA units=95/5 (mass %).

The emulsion of the starting material polymer (A-1) and the emulsion of the second polymer (B-5) was mixed so that the mass ratio of the starting material polymer (A-1) and the second polymer (B-5) would be 90/10 to obtain a water/oil repellent composition (C-10) (blended product).

A test cloth was obtained in the same manner as in Ex. 1, except that the water/oil repellent composition (C-10) was used, instead of the water/oil repellent composition (C-1).

Ex. 11

In a glass beaker, 9.53 g of C6FMA, 22.54 g of BeA, 2.67 g of an NMAM aqueous solution, 0.40 g of HEMA, 10.44 g of a PEO-30 aqueous solution, 0.21 g of EPO-40, 0.66 g of STMAC, 22.96 g of DPGMME, 60.82 g of water and 0.42 g of DoSH were added, heated at 60° C. for 30 minutes and then mixed by means of a homomixer (BIO Mixer, manufactured by Nippon Seiki Co., Ltd.). The obtained liquid was treated in the same manner as in Ex. 1 to obtain an emulsion containing both a monomer component (a-1) for forming a starting material polymer (A-1) and a monomer component (b-1). The mass ratio of the monomer component (a-1) and the monomer component (b-1) was 90/10.

The emulsion containing both the monomer component (a-1) and the monomer component (b-1) was put into a stainless steel reactor and cooled to at most 20° C. Then, 1.46 g of VA-061A was added, and the gas phase was replaced by nitrogen. The polymerization reaction was carried out with stirring at 60° C. for 15 hours to obtain an emulsion of a water/oil repellent composition (C-11) by batch polymerization. The proportions of the respective units in the batch polymerization product were C6FMA units/BeA units/NMAM units/HEMA units/VCM units=22.82/54.00/3.33/0.95/18.90 (mass %).

A test cloth was obtained in the same manner as in Ex. 1, except that the water/oil repellent composition (C-11) was used, instead of the water/oil repellent composition (C-1).

Ex. 12

In a glass beaker, 2.68 g of DPGMME, 25.45 g of C6FMA, 1.34 g of HEMA and 0.27 g of DoSH were added, stirred at 35° C. for 30 minutes to obtain a monomer component (b-6). The monomer component concentration in the liquid of the monomer component (b-6) was 90 mass %.

58.57 g of the emulsion of starting material polymer (A-1) and 1.43 g of the liquid of the monomer component (b-6) were added in a glass reactor, stirred at 60° C. for 30 minutes and then cooled to at most 20° C. Then, 0.046 g of V-65 was added, and the gas phase was replaced by nitrogen. Then, the polymerization reaction was carried out with stirring at 60° C. for 12 hours to obtain a water/oil repellent composition (C-12) by core-shell polymerization. The ratio of the mass of the starting material polymer (A-1) and the total mass of the monomer component (b-6) was 90/10. The proportions of the respective units in the polymer (Y-1) constituting the shell part of the water/oil repellent composition by core-shell polymerization were C6FMA units/HEMA units=95/5 (mass %).

A test cloth was obtained in the same manner as in Ex. 1, except that the water/oil repellent composition (C-12) was used, instead of the water/oil repellent composition (C-1).

Ex. 13

Two-step polymerization was carried out in the same manner as in Ex. 4 to obtain a water-oil repellent composition (C-13), except that the starting material polymer (A-3) was used, instead of the starting material polymer (A-1).

A test cloth was obtained in the same manner as in Ex. 1, except that the water/oil repellent composition (C-13) was used, instead of the water/oil repellent composition (C-1).

Standard Ex. 1

A test cloth was obtained in the same manner as in Ex. 1, except that the emulsion of the starting material polymer (A-1) was used, instead of the water/oil repellent composition (C-1).

Standard Ex. 2

A test cloth was obtained in the same manner as in Ex. 1, except that the emulsion of the starting material polymer (A-3) was used, instead of the water/oil repellent composition (C-1).

The proportions of the respective units in the starting material polymer (A-1) to (A-3) and the polymer (Y-1) and the proportions of the respective monomers in the monomer components (b-1) to (b-5) are shown in Table 2.

Further, the polymerization conditions and the evaluation results of Ex. 1 to 13 are shown in Table 3 (in Ex. 11, only the polymerization state and evaluations are shown). The oil repellency, the water repellency and the heavy-rain durability in Ex. 1 to 12 were evaluated by "grade difference from standard" based on the grades of the oil repellency, the water repellency and the heavy-rain durability in Standard Ex. 1 as the standard. The oil repellency, the water repellency and the heavy-rain durability in Ex. 13 were evaluated by "grade difference from standard" based on the grades of the oil repellency, the water repellency and the heavy-rain durability in Standard Ex. 2 as the standard.

In columns of polymerization state in Table 3, "homo" means homopolymerization, "two-step" means two-step polymerization, "blend" means simple blend of the emulsion of the starting material polymer and a polymer obtained by polymerizing the monomer component (b) in the absence of the starting material polymer, "batch" means batch polymerization, and "core-shell" means core-shell polymerization.

TABLE 2

| | | | | | | unit: mass % | |
|---|---|---|---|---|---|---|---|
| | | C6FMA | BeA | StA | NMAM | HEMA | VCM |
| Starting | (A-1) | 14.8 | 60 | — | 3.7 | 0.5 | 21 |
| material | (A-2) | 18 | 10 | 50.5 | 0.5 | — | 21 |
| polymer | (A-3) | — | 74.8 | — | 3.7 | 0.5 | 21 |
| Monomer | (b-1) | 95 | — | — | — | 5 | — |
| component | (b-2) | 100 | — | — | — | — | — |
| (b) | (b-3) | 80 | 15 | — | — | 5 | — |
| | (b-4) | 70 | 25 | — | — | 5 | — |
| | (b-5) | 95 | — | — | — | 5 | — |
| Polymer (shell) | (Y-1) | 95 | — | — | — | 5 | — |

TABLE 3

|  |  | Standard Ex. 1 | Standard Ex. 2 | Ex. 1 | Ex. 2 | Ex. 3 | Ex. 4 | Ex. 5 |
|---|---|---|---|---|---|---|---|---|
| Polymerization state |  | Homo | Homo | Two-step | Two-step | Two-step | Two-step | Two-step |
| Emulsion of starting material polymer | Starting material polymer | (A-1) | (A-3) | (A-1) | (A-1) | (A-1) | (A-1) | (A-1) |
|  | Content of Rf monomer units [mass %] | 14 | 0 | 14 | 14 | 14 | 14 | 14 |
|  | Charged amount [g] | — | — | 59.0 | 58.0 | 56.9 | 55.9 | 46.7 |
|  | Mass of starting material polymer [g] | — | — | 11.21 | 11.01 | 10.81 | 10.61 | 8.87 |
| Emulsion of monomer compound (b) | Monomer component (b) | — | — | (b-1) | (b-1) | (b-1) | (b-1) | (b-1) |
|  | Content of Rf monomer units [mass %] | — | — | 95 | 95 | 95 | 95 | 95 |
|  | Charged amount [g] | — | — | 1.0 | 2.0 | 3.0 | 4.0 | 13.0 |
|  | Total mass of monomer component (b) [g] | — | — | 0.3 | 0.6 | 0.9 | 1.2 | 3.8 |
| Polymerization initiator | VA-061A | — | — | 0.03 | 0.06 | 0.09 | 0.12 | 0.38 |
|  | V-65 | — | — | — | — | — | — | — |
| Ratio (A)/(b) of starting material polymer and total mass of monomer component (b) |  | — | — | 98/2 | 95/5 | 93/7 | 90/10 | 70/30 |
| Water/oil repellent composition |  | — | — | (C-1) | (C-2) | (C-3) | (C-4) | (C-5) |
| Evaluation | Oil repellency Grade | 1 | 0 | 3 | 3 | 3 | 3 | 3 |
|  | Grade difference from standard | — | — | 2 | 2 | 2 | 2 | 2 |
|  | Water repellency Grade | 5 | 4 | 5 | 5 | 5 | 5 | 5 |
|  | Grade difference from standard | — | — | 0 | 0 | 0 | 0 | 0 |
|  | Heavy-rain durability Grade | 5 | 3 | 5 | 5 | 5 | 4 | 4 |
|  | Grade difference from standard | — | — | 0 | 0 | 0 | −1 | −1 |

|  |  | Ex. 6 | Ex. 7 | Ex. 8 | Ex. 9 | Ex. 10 | Ex. 11 | Ex. 12 | Ex. 13 |
|---|---|---|---|---|---|---|---|---|---|
| Polymerization state |  | Two-step | Two-step | Two-step | Two-step | Blend | Batch | Core-shell | Two-step |
| Emulsion of starting material polymer | Starting material polymer | (A-1) | (A-1) | (A-1) | (A-1) | (A-1) | — | (A-1) | (A-3) |
|  | Content of Rf monomer units [mass %] | 14 | 14 | 14 | 14 | 14 | — | 14 | 0 |
|  | Charged amount [g] | 55.9 | 55.9 | 30.0 | 55.9 | — | — | 58.6 | 55.9 |
|  | Mass of starting material polymer [g] | 10.61 | 10.61 | 5.70 | 10.61 | — | — | 11.13 | 10.61 |
| Emulsion of monomer compound (b) | Monomer component (b) | (b-2) | (b-3) | (b-1) | (b-4) | (b-5) | — | (b-6) | (b-1) |
|  | Content of Rf monomer units [mass %] | 100 | 80 | 95 | 70 | 95 | — | — | 95 |
|  | Charged amount [g] | 4.0 | 4.0 | 29.2 | 4.0 | — | — | 1.4 | 4.0 |
|  | Total mass of monomer component (b) [g] | 1.2 | 1.2 | 8.5 | 1.2 | — | — | 1.3 | 1.2 |
| Polymerization initiator | VA-061A | 0.12 | 0.12 | 0.85 | 0.12 | 4.81 | — | — | 0.12 |
|  | V-65 | — | — | — | — | — | — | 0.046 | — |
| Ratio (A)/(b) of starting material polymer and total mass of monomer component (b) |  | 90/10 | 90/10 | 40/60 | 90/10 | 90/10 | — | 90/10 | 90/10 |
| Water/oil repellent composition |  | (C-6) | (C-7) | (C-8) | (C-9) | (C-10) | (C-11) | (C-12) | (C-13) |
| Evaluation | Oil repellency Grade | 3 | 3 | 4 | 1.5 | 3 | 1 | 2 | 0.5 |
|  | Grade difference from standard | 2 | 2 | 3 | 0.5 | 2 | 0 | 1 | −0.5 |
|  | Water repellency Grade | 5 | 5 | 5 | 5 | 4 | 4 | 4 | 2 |
|  | Grade difference from standard | 0 | 0 | 0 | 0 | −1 | −1 | −1 | −2 |
|  | Heavy-rain durability Grade | 5 | 5 | 3 | 3 | 3 | 3 | 3 | 1 |
|  | Grade difference from standard | 0 | 0 | −2 | −2 | −2 | −2 | −2 | −2 |

It is evident from Table 3 that in Ex. 1 to 7 where the emulsion of the starting material polymer and the emulsion of the monomer component (b) were mixed, and the monomer component (b) was polymerized to obtain a water/oil repellent composition, the grade difference of the oil repellency was +2 based on the grade of the oil repellency in Standard Ex. 1 as the standard. That is, the oil repellency was excellent. Further, in Ex. 1 to 7, the grade difference of the water repellency was 0 based on the grade of the water repellency in Standard Ex. 1 as the standard. That is, the water repellency was maintained. Further, in Ex. 1 to 7, the grade difference of the heavy-rain durability was −1 or 0 based on the grade of the heavy-rain durability of Standard Ex. 1 as the standard. That is, the heavy-rain durability was not worsen significantly.

On the other hand, in Ex. 8 to 12 where a water/oil repellent composition was obtained by a method different from the production method of the present invention, the grade difference of the heavy-rain durability was −2 based on the grade of the heavy-rain durability in Standard Ex. 1 as the standard. That is, the heavy-rain durability was worsen significantly. In Ex. 10 to 12 where blend, batch polymerization or core-shell polymerization was employed, the grade difference of the water repellency was −1 based on the grade of the water repellency in Standard Ex. 1 as the standard. That is, the water repellency was poor.

In Ex. 13 where the starting material polymer having no Rf monomer unit was used to obtain a water/oil repellent composition, the grade differences of the oil repellency and the water repellency were −0.5 and −2 respectively. That is, the oil repellency and the water repellency were poor.

As described above, in the case of the water/oil repellent compositions containing the emulsion obtained by mixing the emulsion of the starting material polymer and the emulsion of the monomer component (b) and polymerizing the monomer component (b) (two-step polymerization) in Ex. 1 to 7, the water repellency is not significantly impaired, and the water/oil repellency is excellent, as compared with the water/oil repellent compositions containing the emulsion obtained by simple blend, batch polymerization or core-shell polymerization in Ex. 10 to 12. It is thereby considered that the dispersion state of the polymer is different between the water/oil repellent compositions in Ex. 1 to 7 and the water/oil repellent compositions in Ex. 10 to 12, whereby the above effect can be obtained.

Ex. 14

A water/oil repellent composition (C-14) was obtained by the two-step polymerization in the same manner as in Ex. 4, except that the emulsion of the starting material polymer (A-2) was used, instead of the emulsion of the starting material polymer (A-1).

A test cloth was obtained in the same manner as in Ex. 1, except that the water/oil repellent composition (C-14) was used, instead of the water/oil repellent composition (C-1).

Standard Ex. 3

A test cloth was obtained in the same manner as in Ex. 1, except that the emulsion of the starting material polymer (A-2) was used, instead of the water/oil repellent composition (C-1).

The polymerization conditions and the evaluation results of Standard Ex. 3 and Ex. 14 are shown in Table 4. The oil repellency, the water repellency and the heavy-rain durability in Ex. 14 were evaluated by "grade difference from standard" based on the grades of the oil repellency, the water repellency and the heavy-rain durability in Standard Ex. 1 as the standard.

TABLE 4

| | | | Standard Ex. 3 | Ex. 14 |
|---|---|---|---|---|
| Polymerization state | | | Homo | Two-step |
| Emulsion of starting material polymer | Starting material polymer | | (A-2) | (A-2) |
| | Content of Rf monomer units [mass %] | | 18 | 18 |
| | Charged amount [g] | | — | 55.9 |
| | Mass of starting material polymer [g] | | — | 10.61 |
| Emulsion of monomer compound (b) | Monomer component (b) | | — | (b-1) |
| | Content of Rf monomer units [mass %] | | — | 95 |
| | Charged amount [g] | | — | 4.0 |
| | Total mass of monomer component (b) [g] | | — | 1.2 |
| Polymerization initiator | VA-061A | | — | 0.12 |
| | V-65 | | — | — |
| Ratio (A)/(b) of starting material polymer and total mass of monomer component (b) | | | — | 90/10 |
| Water/oil repellent composition | | | — | (C-14) |
| Evaluation | Oil repellency | Grade | — | 1 |
| | | Grade difference from standard | — | 1 |
| | Water repellency | Grade | 4 | 4 |
| | | Grade difference from standard | — | 0 |
| | Heavy-rain durability | Grade | 2 | 2 |
| | | Grade difference from standard | — | 0 |

It is evident from Table 4 that in Ex. 14 where the water/oil repellent composition was obtained by mixing the emulsion of the starting material polymer and the emulsion of the monomer component (b) and polymerizing the monomer component (b), the grade difference of the oil repellency was +1 based on the grade of the oil repellency in Ex. 3 as the standard. That is, the oil repellency was excellent. Further, in Ex. 14, the grade differences based on the grades of the water repellency and the heavy-rain durability in Standard Ex. 3 as the standard, were 0. That is, the water repellency and the heavy-rain durability were maintained.

This application is a continuation of PCT Application No. PCT/JP2019/007355, filed on Feb. 26, 2019, which is based upon and claims the benefit of priority from Japanese Patent Application No. 2018-042322 filed on Mar. 8, 2018. The contents of those applications are incorporated herein by reference in their entireties.

What is claimed is:

1. A method for producing a water/oil repellent composition, the method comprising mixing an emulsion of a polymer having first units based on a monomer having a perfluoroalkyl group and an emulsion of a monomer component containing a monomer having a perfluoroalkyl group and then polymerizing the monomer component, wherein the proportion of the first units based on a monomer having a perfluoroalkyl group is from 10 to 50 mass % per all units in the polymer, the proportion of the monomer having a perfluoroalkyl group is at least 80 mass % per the total amount of the monomer component, the emulsion of the polymer and the emulsion of the monomer component are mixed so that the proportion of the mass of the polymer will be from 50 to 99 mass % per the sum of the mass of the polymer and the total mass of the monomer component, and the emulsion of the monomer component comprises emulsified particles having an average particle size of from 50 to 600 nm.

2. The method for producing a water/oil repellent composition according to claim 1, wherein the polymer further has second units based on a (meth)acrylate having a $C_{12-30}$ alkyl group and having no polyfluoroalkyl group, and the proportion of the second units is from 10 to 80 mass % per all units in the polymer.

3. The method for producing a water/oil repellent composition according to claim 2, wherein the polymer has third units based on a (meth)acrylate having a $C_{20-30}$ alkyl group and having no polyfluoroalkyl group, and the proportion of the third units is from 20 to 100 mass % per all units of the second units based on the (meth)acrylate having a $C_{12-30}$ alkyl group and having no polyfluoroalkyl group.

4. The method for producing a water/oil repellent composition according to claim 1, wherein the polymer further has second units based on a halogenated olefin, and the proportion of the second units is at most 50 mass % per all units in the polymer.

5. The method for producing a water/oil repellent composition according to claim 1, wherein the polymer further has second units based on a monomer having a crosslinkable functional group, and the proportion of the second units is at most 20 mass % per all units in the polymer.

6. The method for producing a water/oil repellent composition according to claim 1, wherein the monomer component further contains from 1 to 20 mass % of a (meth)acrylate having a $C_{12-30}$ alkyl group and having no polyfluoroalkyl group per the total mass of the monomer component.

7. The method for producing a water/oil repellent composition according to claim 1, wherein the monomer component further contains from 0.1 to 15 mass % of a monomer having a cross-linkable functional group per the total mass of the monomer component.

8. The method for producing a water/oil repellent composition according to claim 1, wherein the emulsion of the monomer component is an emulsion obtained by emulsifying a mixture containing the monomer component, a surfactant and a medium by a high pressure emulsifier.

9. The method for producing a water/oil repellent composition according to claim 1, wherein at least one cross-linking agent selected from the group consisting of an isocyanate crosslinking agent, a methylol crosslinking agent, a carbodiimide crosslinking agent and an oxazoline crosslinking agent is added after the polymerization of the monomer component.

10. A method for producing a water/oil repellent article, which comprises treating an article to be treated with an water/oil repellent composition produced by the production method as defined in claim 1.

11. The method for producing a water/oil repellent composition according to claim 1, wherein the monomer component is not polymerized by core-shell polymerization.

\* \* \* \* \*